United States Patent [19]

Hill

[11] 4,219,990
[45] Sep. 2, 1980

[54] BEARING MOUNT FOR A CORN HARVESTER SNAPPING ROLL

[75] Inventor: Donald J. Hill, La Porte, Ind.

[73] Assignee: Allis-Chalmers Corporation, Milwaukee, Wis.

[21] Appl. No.: 34,918

[22] Filed: May 1, 1979

[51] Int. Cl.³ .......................................... A01D 45/02
[52] U.S. Cl. ...................................... 56/14.2; 56/104
[58] Field of Search ............... 56/14.2, 98, 111, 119, 56/106, 104, 105, 14.1, 112; 403/91, 87, 162

[56] References Cited

U.S. PATENT DOCUMENTS

| 1,945,364 | 1/1934 | Coultas | 56/104 |
| 2,821,058 | 1/1958 | Jones | 56/104 |
| 3,222,852 | 12/1965 | Ward et al. | 56/104 |
| 3,271,940 | 9/1966 | Ashton et al. | 56/105 |
| 3,554,479 | 1/1971 | Slemmons | 403/91 |
| 3,858,384 | 1/1975 | Maiste et al. | 56/14.2 |

FOREIGN PATENT DOCUMENTS 1246303  8/1967  Fed. Rep. of Germany ............. 56/104

Primary Examiner—Paul J. Hirsch
Attorney, Agent, or Firm—Charles L. Schwab

[57] ABSTRACT

The mount (17) for the front bearing (19) of a corn harvester snapping roll (14) is in two parts (18, 21) which have cooperative end portions which permit relative adjustment of such parts about a laterally extending axis (62). Such adjustment permits the front bearing axis (31) to be placed in a lateral plane (61) in which the snapping roll rear bearing axis (32) is also disposed.

4 Claims, 3 Drawing Figures

BEARING MOUNT FOR A CORN HARVESTER SNAPPING ROLL

This invention relates to agricultural harvesting equipment and specifically to a front bearing mount for the snapping rolls of a corn harvester.

BACKGROUND OF PRIOR ART

Corn harvesters are customarily provided with a pair of snapping rolls for removing ears of corn from corn stalks. It is the usual practice to rotatably support the rear ends of the snapping rolls on a harvester subframe and to drive the rolls by gear mechanism engaging gears on the rear ends of the rolls. It is also customary to support the front ends of the snapping rolls by bearings mounted on the harvester subframe. As shown in U.S. Pat. No. 3,222,852, a pair of snapping rolls are rotatably supported near their front ends by bearings supported in laterally extending brackets. In each of U.S. Pat. Nos. 2,821,058; 3,271,940; and 3,858,384, each of the brackets for supporting the front bearings for snapping rolls includes two parts which are hinged to one another about an upright axis. While the hinged connection of the front bearing mount parts permit alignment of the axes of the front and rear snapping roll bearings in a vertical plane, such connection does not facilitate alignment of the axes of the bearings in a laterally extending and generally horizontal plane.

BRIEF SUMMARY OF THE INVENTION

This invention, which has particular utility in a corn harvester having fore and aft extending snapping rolls, provides a novel mount for supporting the front bearing of the snapping roll. The bearing mount includes first and second parts in general lateral end-to-end alignment with adjacent ends thereof presenting mating cylindrical surfaces defining a cylinder whose axis extends in a lateral direction permitting the parts to be pivotally adjusted relative to one another about the lateral axis. A releasable fastening means secures adjacent ends of the parts to one another whereby the parts are releasably retained in fixed position relative to one another. A front snapping roll bearing is supported by one of the parts and the other part is rigidly, but releasably, secured to the harvester frame.

One of the adjacent ends of the mounting parts may be bifurcated with upper and lower legs having radially inward facing cylindrical surfaces and the other of the adjacent ends having upper and lower cylindrical surfaces complementary to and in engagement with the radially inward facing surfaces. The adjacent ends may have aligned openings receiving a tension member constituting part of the releasable fastening means. In order to permit relative adjustment of said parts about the lateral axis of the cylindrical surfaces, the opening in the part between the bifurcated end is enlarged sufficiently to provide a loose fit with the tension member. The openings may be drilled holes and the tension member may be a bolt, in which event the diameter of the enlarged opening is substantially greater than the diameter of the shank of the bolt.

BRIEF DESCRIPTION OF THE DRAWINGS

The drawings illustrate the invention in a corn harvester wherein.

DETAILED DESCRIPTION OF THE INVENTION

Figure 1:
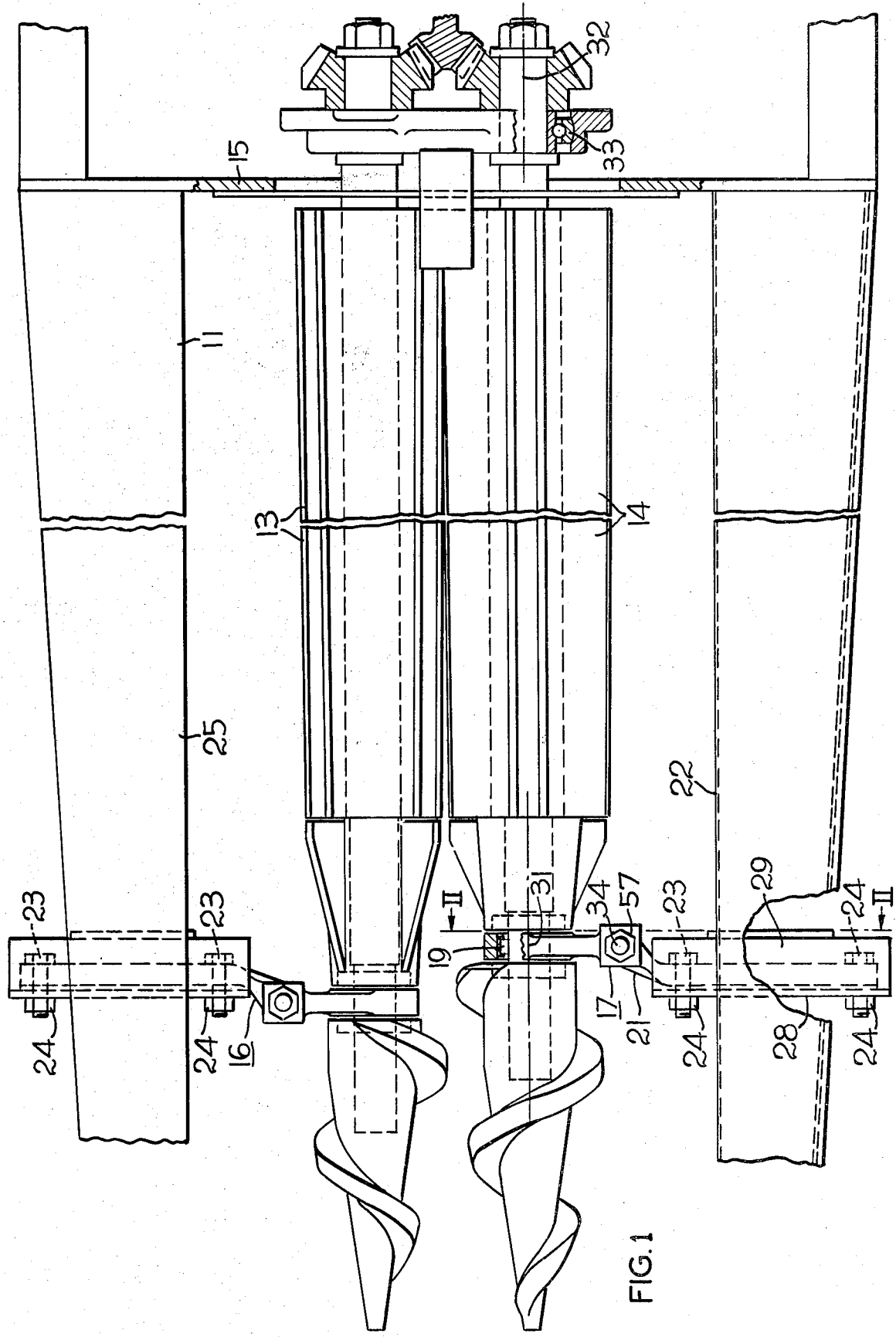
FIG. 1 is a top view of part of a corn harvester showing a pair of snapping rolls.
Figure 2:
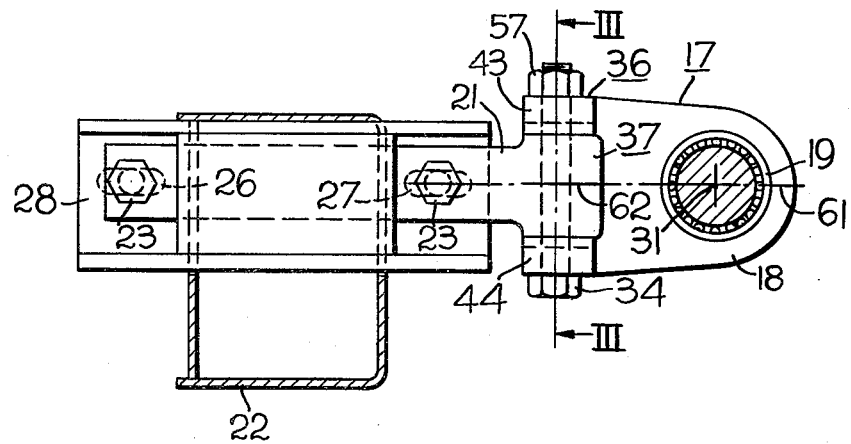
FIG. 2 is a view taken along the line II—II in FIG. 1.

Referring to FIG. 1, a row unit 11 for a corn harvester includes a pair of snapping rolls 13, 14 which are supported at their forward ends by bearing mounts 16, 17. Referring also to FIG. 2, bearing mount 17 is in two parts with one part 18 carrying a roller bearing 19 supporting the front end of snapping roll 14. The mount 17 includes another part 21 which is in general lateral alignment with part 18 and is releasably secured to a side frame 22 of the row unit 11 by bolts 23 and nuts 24. Laterally elongated openings 26, 27 in the web 28 of a channel-shaped mounting pad 29 on the side frame 22 so as to permit adjustment of the position of the front bearing 19 in a lateral direction relative to the frame 22.

Figure 3:
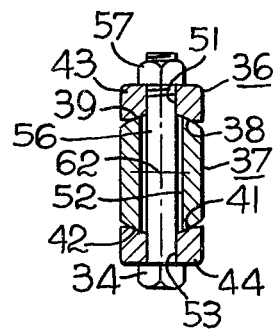
FIG. 3 is a view taken along the line III—III in FIG. 2.

It has been found to be desirable to provide for adjustment of the fore and aft extending axis 31 of roller bearing 19 to a position of alignment with the axis 32 of the rear bearing 33 whereby both axes lie the same generally horizontal plane 61. In order to accomplish this objective, the adjacent ends 36, 37 of the parts 18, 21 are formed with complementary cylindrical surfaces 38, 39, 41, 42, as shown in FIG. 3, which have a common axis 62 which lies in the generally horizontal plane 61. The end 36 is bifurcated with an upper leg 43 presenting the radially inwardly facing cylindrical surface 38 and a lower leg 44 presenting the radially inwardly facing cylindrical surface 41, such cylindrical surfaces 38, 41 being in diametrically opposed relation to one another. The end 37 of part 21 is disposed in lapped relation to and between the legs 43, 44 of the end 36 of part 18 and presents the diametrically oppositely disposed radially outwardly facing cylindrical surfaces 39, 42.

Aligned openings 51, 52, 53 are formed in leg 43, end 37 and leg 44, respectively, with the front to rear width of opening 52 being substantially larger than the diameter of openings 51, 53, and substantially larger than the diameter of the shank 56 of the bolt 34. The bolt 34 is a tension member and is placed under tension by threading a nut 57 on its upper threaded end. When the nut 57 is tightened on the bolt 34, the cylindrical surfaces 38, 42 on the legs 43, 44 are brought into frictional engagement with the complementary cylindrical surfaces 39, 42 on part 21 so as to rigidly maintain the parts 18 and 21 in assembly. The enlarged opening 52 in the end 37 of part 21 permits part 18 to be adjusted relative to part 21 about the lateral axis 62 which in the illustrated embodiment of the invention intersects the axis 31 of the front bearing 19 and lies in the lateral plane 61.

UTILIZATION AND OPERATION OF THE INVENTION

When the snapping rolls 13, 14 are installed in a corn head at the time of manufacture, any build up of tolerances affecting alignment of the axes of the snapping roll bearings in a horizontal plane can be compensated for by the present invention. In assembly of the row unit, the bearings for the rear of the snapping rolls are mounted in a row unit frame 15 and then the mounts 16 and 17 for the front bearings are secured by bolts 23 and nuts 24 so as to place the front end of the snapping rolls 13, 14 in the desired lateral position between the forwardly extending frame elements 22, 25. The nut 57 on bolt 34 is left in a loose condition to this point in the assembly process and upon it being tightened the parts 18 and 21 will automatically adjust relative to one another about the lateral axis 62, thereby insuring alignment of the bearing axis 31 with the axis 32 of bearing 33 in the laterally extending plane 61. Misalignment of the bearing axes 31, 32 would cause undue stress or loading of bearing 19 and result in its premature failure. As those familiar with the art will appreciate, the present invention provides an effective, inexpensive means for adjusting the mount for the front bearing of a snapping roll to place its axis in a generally horizontal plane in which the rear snapping roll bearing axis is disposed.

The embodiments of the invention in which an exclusive property or privilege is claimed are defined as follows:

1. In a corn harvester having fore and aft extending snapping rolls each having its front and rear ends rotatably supported on the frame of the harvester by front and rear bearings, a mount for supporting the front bearing characterized by first and second parts in general lateral end-to-end alignment with adjacent ends thereof presenting mating cylindrical surfaces defining a cylinder whose axis extends in a lateral direction permitting said parts to be pivotally adjusted relative to one another about said axis to permit alignment of the axes of said front and rear bearings in a generally horizontal plane, first releasable fastening means securing said adjacent ends of said parts to one another whereby said parts are releasably retained in fixed position relative to one another the bearing at the front of one of said snapping rolls being supported by one of said parts, and second releasable fastening means rigidly securing said other part to said frame.

2. The combination defined in claim 1 wherein said adjacent ends of said parts are further characterized by one of said ends being bifurcated with upper and lower legs presenting radially inward facing cylindrical surfaces and by the other of said ends having upper and lower radially outward cylindrical surfaces formed complementary to and in engagement with said radially inward facing surfaces.

3. The combination of claim 2 wherein said adjacent ends have aligned vertical openings, said first releasable fastening means includes a tension member extending through said openings, and said cylindrical surfaces being brought into engagement upon tightening of said first fastening means.

4. The combination of claim 3 wherein said opening in said other end has a sufficient front to rear width to permit relative pivotal movement of said parts about said lateral axis when said tension member extends through said openings.

* * * * *